United States Patent
Paulraj et al.

(10) Patent No.: US 11,728,862 B1
(45) Date of Patent: Aug. 15, 2023

(54) COMMUNICATION SYSTEM AND METHOD FOR REMOTE ANTENNA ARRAY-BASED HIGH-SPEED LOW-LATENCY 5G CELLULAR CONNECTIVITY

(71) Applicant: Movandi Corporation, Irvine, CA (US)

(72) Inventors: Arogyaswami Paulraj, Stanford, CA (US); Brima Ibrahim, Laguna Hills, CA (US)

(73) Assignee: Movandi Corporation, Irvine, CA (US)

( * ) Notice: Subject to any disclaimer, the term of this patent is extended or adjusted under 35 U.S.C. 154(b) by 0 days.

(21) Appl. No.: 17/835,188

(22) Filed: Jun. 8, 2022

(51) Int. Cl.
*H04B 7/06* (2006.01)
*H04B 7/024* (2017.01)

(52) U.S. Cl.
CPC ........... *H04B 7/0617* (2013.01); *H04B 7/024* (2013.01)

(58) Field of Classification Search
CPC ............................. H04B 7/0617; H04B 7/024
See application file for complete search history.

(56) References Cited

U.S. PATENT DOCUMENTS

2019/0281534 A1* 9/2019 Yu .......................... H04J 11/0076
2020/0252951 A1* 8/2020 Frenne ................ H04W 72/535

* cited by examiner

Primary Examiner — Sung S Ahn
(74) Attorney, Agent, or Firm — Chip Law Group

(57) ABSTRACT

A communication system that includes a management server communicatively coupled to a gNB and a plurality of remote antenna arrays distributed spatially over a geographical area. The management server causes each remote antenna array of the plurality of remote antenna arrays to obtain one or more signal synchronization block (SSB) signals in a mmWave frequency band from the gNB via a dedicated communication medium. Each remote antenna array of the plurality of remote antenna arrays obtains different SSB signals via the dedicated communication medium. The management server further causes each remote antenna array of the plurality of remote antenna arrays to execute beamforming to direct one or more beams of RF signals corresponding to the obtained one or more SSB signals to serve its corresponding UEs.

20 Claims, 10 Drawing Sheets

COMMUNICATION SYSTEM AND METHOD FOR REMOTE ANTENNA ARRAY-BASED HIGH-SPEED LOW-LATENCY 5G CELLULAR CONNECTIVITY

CROSS-REFERENCE TO RELATED APPLICATIONS/INCORPORATION BY REFERENCE

None.

FIELD OF TECHNOLOGY

Certain embodiments of the disclosure relate to a communication system. More specifically, certain embodiments of the disclosure relate to a communication system and method for remote antenna array-based high-speed low-latency 5G cellular connectivity.

BACKGROUND

Typically, a Long-Term Evolution (LTE) base station may comprise three sectors or more (e.g., macro site) for longer range and higher capacity. Such base station may include a Baseband Unit (BBU) and one or more Remote Radio Heads (RRH) which is a typical design for 4G LTE. The remote radio heads are typically mounted up on the base station tower next to sector antenna(s) and connected with short radio frequency (RF) jumper cables. In modern 4G networks, the base station is termed Evolved NodeB (eNodeB). For 5G networks, the term Next Generation NodeB (gNodeB or simply gNB) is used for 5G New Radio (NR) base station. In traditional cellular networks, commonly three-sectored approach is used where each sector may be a 120 degree sector usually supported by a large wide beam antenna. In 5G NR, a single large local gNB antenna array may be usually employed to form multiple micro-sectors within a typical 120 degree sector, i.e., may form multiple Synchronization Signal Block (SSB) beams. The SSB beams are generally static or semi-static, always pointing to the same direction and such SSB beams form a grid of beams in different directions covering a surrounding cell area of a typical gNB. Moreover, the different SSBs (beams) from the gNB may be transmitted at different times to reduce or avoid intra-cell interference among the SSB beams.

Currently, next generation networks, such as 5G and upcoming 6G, is an active area of research and many benefits has been proposed, for example, faster communication between user equipment (UEs). However, there are many open technical challenges for a successful and practical use of the 5G or the upcoming 6G environment. In a first example, one of the most prominent technical issue is how to increase coverage in mmWave frequency band while maintaining or even increasing speed, i.e., data throughput. With existing telecommunication systems, the trade-off for speed at mmWave frequencies is limited range and coverage. In a second example, Quality of experience (QoE) is another open issue, which is a measure of a user's holistic satisfaction level with a service provider (e.g., Internet access, video streaming, phone call, or other carrier network-enabled services). The challenge is how to ensure a seamless connectivity as well as QoE without significantly increasing infrastructure cost, which may be commercially unsustainable with present solutions. In a third example, currently, a large number of gNBs and small cells are envisioned for the dense deployment of the 5G NR mobile networks, which is expected to increase the issue of signal interference and signal noise. Furthermore, the number of wireless sensors and IoT devices are rapidly increasing with the increase in smart homes, smart offices, enterprises, etc. Existing communication systems are unbale to handle such massive number of wireless sensors and IoT devices and their quality-of-service (QoS) requirements. In such cases, it is extremely difficult and technically challenging to support these end user devices for high-speed low latency applications.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A communication system and method for remote antenna array-based high-speed low-latency 5G cellular connectivity, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a communication system and method for remote antenna array-based high-speed low-latency 5G cellular connectivity. The communication system and method of the present disclosure not only improves coverage of a gNodeB but also improves data transfer rates between at least two communication devices as compared to existing telecommunication systems as well as enables ultra-low latency communication and an always-connected experience. The communication system is capable of extending the range of the gNB as well as increasing bandwidth while reducing (or even removing) signal noise and achieving almost near zero latency for high-performance communication. The disclosed communication system and method is fully transparent to the user equipment (UEs), which means that the UEs connect to the remote antenna array assuming the remote antenna array to be a standard gNB array. Thus, in other words, the remote antenna arrays takes the functionalities of the gNB (with some tweaks, for example, by handling less synchronization signal block (SSB) micro-sectors) closer to the UEs while improving coverage and data throughput. In the following description, reference is made to the accompanying drawings, which form a part hereof, and in which is shown, by way of illustration, various embodiments of the present disclosure.

Figure 1A:
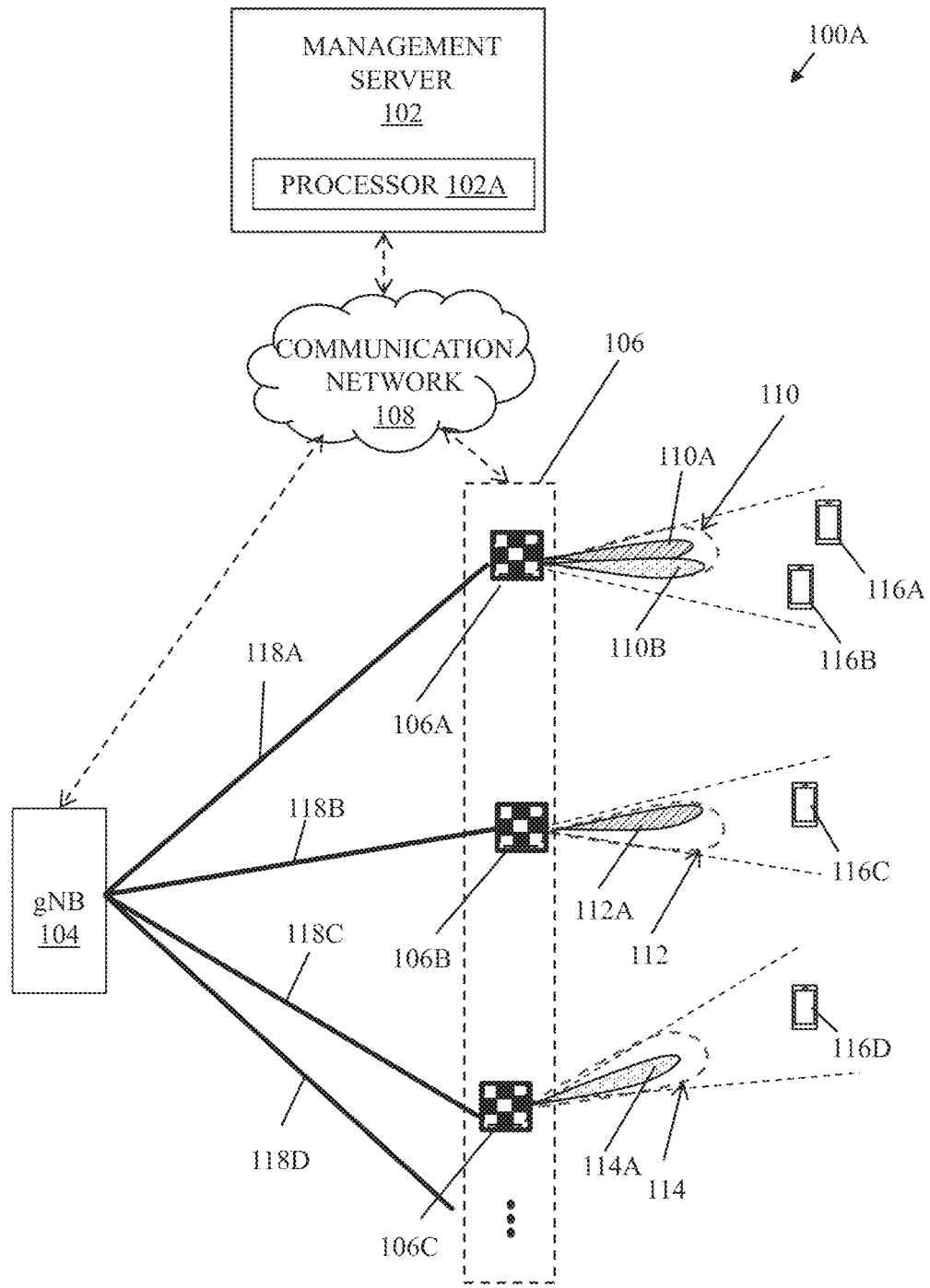
FIG. 1A is a diagram illustrating an exemplary communication system for remote antenna array-based high-speed low-latency 5G cellular connectivity, in accordance with an exemplary embodiment of the disclosure.

FIG. 1A is a diagram illustrating an exemplary communication system for remote antenna array-based high-speed low-latency 5G cellular connectivity, in accordance with an exemplary embodiment of the disclosure. With reference to FIG. 1A, there is shown a communication system 100A that may include a management server 102, a gNodeB (gNB) 104, and a plurality of remote antenna arrays 106. There is further shown a communication network 108, a plurality of synchronization signal block (SSB) beams, such as SSB beams 110,112, and 114, and a plurality of user equipment (UEs), such as UEs 116A, 116B,116C, and 116D.

The management server 102 includes suitable logic, circuitry, and interface es that may be configured to communicate with the gNB 104, the plurality of remote antenna arrays 106, and the UEs 116A, 116B,116C, and 116D. The management server 102 may be employed to interact with the plurality of remote antenna arrays 106, which may be spatially distributed in a geographical area (e.g., within a building or outside the building, or a combination thereof) via a management plane. In other words, the management server 102 may be communicatively coupled to the gNB 104 and the plurality of remote antenna arrays 106 distributed spatially over a geographical area, such as a specific locality or a building. In an example, the management server 102 may be a remote management server that may be managed by a third party different from service providers associated with a plurality of different wireless carrier networks. In another example, the management server 102 may be a remote management server or a data center that is managed by a third party, or jointly managed, or managed in coordination and association with one or more of the plurality of different wireless carrier networks. In an implementation, the management server 102 may be a master cloud server or a master machine that is a part of a data center that controls an array of other cloud servers communicatively coupled to it, for load balancing, running customized applications, and efficient data management. Examples of the implementation of management server 102 may include, but is not limited to a central controller of a distributed antenna system (DAS), a cloud server, a network management server (NMS), a backplane system, or a network controller. Further, the management server 102 may include a processor 102A. Examples of the implementation of the processor 102A may include but are not limited to an embedded processor, a microcontroller, a specialized digital signal processor (DSP), control circuitry, a Reduced Instruction Set Computing (RISC) processor, an Application-Specific Integrated Circuit (ASIC) processor, a Complex Instruction Set Computing (CISC) processor, and/or other processors, or state machines.

The gNB 104 may be a 5G NR base station. Typically, multiple gNBs corresponding to one service provider, may be geographically positioned to cover specific geographical areas.

Each of the plurality of remote antenna arrays 106, such as the remote antenna arrays 106A, 106B, and 106C, may be a 5G-enabled phased array antenna. The plurality of remote antenna arrays 106 may be spatially distributed to cover a specific geographical area, such as a building or a locality. The plurality of remote antenna arrays 106 may be deployed strategically, for example, in nooks and corners of an enterprise (e.g., a building) such that each remote antenna array provides a full coverage without much overlap with the coverage areas of other antennas, minimizing the total number of antennas required to cover the specific geographical area. In this implementation, the plurality of remote antenna arrays 106 may be implemented as XG-enabled distributed antenna system (DAS), where XG refers to 5G or 6G radio communication. In this case, each of the plurality of remote antenna arrays 106 may comprise a number of antenna elements to support beamforming function for 5G NR communication with one or more UEs, such as the UEs 116A, 116B, 116C, and 116D. In accordance with an embodiment, each of the plurality of remote antenna arrays 106 may be a service antenna array provided in a network device. The network device may be a repeater device, a Transmission/Reception Point (TRP), or a network node comprising a remote antenna array of an XG-enabled distributed antenna system (DAS), where XG refers to 5G or 6G radio communication.

The communication network 108 may be a medium through which the management server 102 may communicate with the gNB 104 and the plurality of remote antenna arrays 106. In an example, the communication network 108 may be an out-of-band communication network. In another example, the communication network 108 may be an in-band communication network associated with a wireless carrier network frequency band.

In an implementation, each of the plurality of remote antenna arrays 106 may be connected to the gNB 104 via a dedicated wired communication medium (e.g., a dedicated communication medium 118A,118B, or 118C), which may be an optical fiber connection, a coaxial cable, and the like. The dedicated wired communication medium (e.g., a dedicated communication medium 118A,118B, or 118C) between the gNB 104 and each of the plurality of remote antenna arrays 106 may be a lossless link. In this case, the wired communication medium between the gNB 104 and each of the plurality of remote antenna arrays 106 may be a different point-to-point wired connection (e.g., a lossless point-to-point link) to segregate different SSB signals from the source node, i.e., the gNB 104 to each of the plurality of remote antenna arrays 106, and to enable high-speed access (e.g., multi-gigabits data rate) with almost negligible or no signal interference for the corresponding UEs being served. In another implementation, each of the plurality of remote antenna arrays 106 may be connected to the gNB 104 via a dedicated point-to-point wireless communication medium, with high-speed access (e.g., multi-gigabits data rate) to a core network, for example, Internet.

In operation, the processor 102A may be configured to cause each remote antenna array of the plurality of remote antenna arrays 106 to obtain one or more synchronization signal block (SSB) signals in a mmWave frequency band from the gNB 104 via a dedicated communication medium (e.g., the dedicated communication medium 118A,118B, or 118C). The dedicated communication medium may be a lossless link. Each remote antenna array of the plurality of remote antenna arrays 106 may obtain different SSB signals via the dedicated communication medium (e.g., a dedicated communication medium 118A,118B, or 118C). The SSB may include Primary Synchronization Signal (PSS) and Secondary Synchronization Signal (SSS) known in the art. The functions of the PSS and SSS are known in the art, and specified in the 3GPP specification for 5G NR and omitted here for the sake of brevity. For example, it is known that the PSS and SSS forms a part of beam management and 5G radio frame synchronization Typically, in conventional communication systems, a conventional gNB (or a 5G enabled small cell) may execute beam sweeping by changing beam direction for each synchronization signal block (SSB) transmission. It is to be understood that the number of different beams transmitted by the given gNB may be determined by how many SSBs are being transmitted within a SSB Burst Set (e.g., a set of SSBs being transmitted in 5 millisecond (ms) window of SSB transmission). Multiple SSBs may be transmitted with a certain interval, and each SSB can be identified by a unique number called SSB index (SSB index 0, 1, 2, 3, . . . , n). Moreover, each SSB is transmitted by the conventional gNB in the conventional communication system via a specific beam radiated in a certain direction, and each SSB index may be mapped to each beam. Moreover, in the current communication system involving 5G NR, a single large local gNB antenna array is used to form multiple micro-sectors (i.e., radiate multiple SSB beams) in different directions by the beam sweeping mechanism known in the art. These radiated beams in mmWave frequencies have limited range, for example, because the mmWave frequencies in 5G NR substantially has a limited range as compared to the 4G LTE. Only the UEs present near and around the gNB of a service provider or a small cell of the same service provider may measure the signal strength of some specific SSBs it detected for a certain period, and based on the measurement result, a UE can identify a SSB index with the strongest signal strength. This SSB with the strongest signal strength may be the best beam for the UE. In other words, in the existing communication system, there is no control of which SSBs will reach a particular geographical area, for example, in and around a building.

Furthermore, in the conventional communication system, many UEs that are located in non-line-of-sight (NLOS) path or beyond the communication range of the gNB require additional infrastructure, such as dense deployment of small cells and conventional repeater devices to fill the coverage gaps in the conventional communication system, which in turn increases the infrastructure cost (e.g., cost of deployment as well as maintenance). In certain scenarios, such radiated multiple SSB beams in different directions using the beam sweeping mechanism in the conventional communication system may be obstructed by one or more signal obstructing objects in a specific geographical area, for example, in and around a building.

In contrast with the conventional communication systems, the communication system 100A of the present disclosure enables improved coverage of the gNB 104 while reducing the infrastructure cost as well as signal noise as well as signal attenuation issues in the mmWave communication. Instead of using the single large local gNB antenna array to radiate multiple SSB beams from one location in different directions by the beam sweeping mechanism, the communication system 100A of the present disclosure employs the plurality of remote antenna arrays 106 that are distributed spatially in the specific geographical area (e.g., in and around a building or a locality), where each of the plurality of remote antenna arrays 106 is communicatively linked to the gNB 104 via a dedicated communication medium (e.g., a wired medium or a point-to-point wireless medium that may be a lossless link). Thus, the range of the gNB 104 can be extended as per choice and need while bypassing any signal obstructing objects. Furthermore, even if the plurality of remote antenna arrays 106 that are distributed spatially within the same locality (e.g., in and around a building), the communication system 100A enables to provide control over which SSBs are received by each remote antenna array of the plurality of remote antenna arrays 106. In other words, the processor 102A may be configured to cause the remote antenna array 106A to obtain a first SSB signal whereas may cause another remote antenna array, such as the remote antenna array 106B to obtain a second SSB signal different from the first SSB signal. No two remote antenna arrays of the plurality of remote antenna arrays 106 may be provided with the same SSB signals. This distribution of the plurality remote antenna arrays 106 as well as distribution of different SSBs (i.e., unique SBB(s)) for each remote antenna array is observed to significantly improve the data throughput rate and improve coverage while reducing or almost nullifying signal interference in the 5G NR communication. Furthermore, each SSB obtained at each remote antenna array has a signal strength higher than a threshold (i.e., having strong signal strength sufficient for multi-gigabit data rate in 5G NR) due to a direct dedicated link from the gNB 104. Simply stated, each of the plurality of remote antenna arrays 106 takes the functionalities of the gNB 104 (with some tweaks, for example, by handling less synchronization signal block (SSB) micro-sectors) closer to the UEs, such as the UEs 116A, 116B,116C, and 116D, while improving coverage and data throughput. The communication system 100A is fully transparent to the UEs 116A, 116B,116C, and 116D so that the UEs 116A, 116B,116C, and 116D may connect to their corresponding remote antenna array assuming the remote antenna array to be a standard gNB array.

The processor 102A may be further configured to cause each remote antenna array of the plurality of remote antenna arrays 106 to execute beamforming to direct one or more beams of radio frequency (RF) signals (e.g., a SSB beam 110 and its constituent refined beams 110A and 110B) corresponding to the obtained one or more SSB signals to serve its corresponding UEs (e.g., UEs 116A and 116B served by the remote antenna array 106A). Since one or more UEs are illuminated by a SSB beam with the signal strength greater than the threshold directed by its nearest remote antenna array for broadcast channel, thus the UEs simply gets registered to one or more refined beams of the SSB beam for control and data channel communications. For example, the UE 116C may perform uplink and downlink communication with the gNB 104 via the remote antenna array 106B using the refined beam 112A (i.e., a narrow beam) of the SSB beam 112. Similarly, the UE 116D may perform uplink and downlink communication with the gNB 104 via the remote antenna array 106C using the refined beam 114A of the SSB beam 114. Each beam of the one or more beams of RF signals may include initially the SSB beam 110, 112, or 114 (i.e., at a first time instant) and then one or more refined beams of the corresponding SSB beam (after a beam refinement) at one or more second time instant (e.g., the refined beams 110A and 110B for the SSB beam 110, the refined beam 112A for the SSB beam 112, and the refined beam 114A for the SSB beam 114). Beneficially, the standard initial acquisition time of 5G NR carrier signal may be reduced due to a preassigned SSB for each remote antenna array and the vicinity of the remote antenna array to its corresponding UEs.

In accordance with an embodiment, each remote antenna array of the plurality of remote antenna arrays 106 may be communicatively coupled to the gNB 104 via a different wired communication medium that corresponds to the dedicated communication medium 118A,118B, 118C, or 118D. For example, the remote antenna array 106A is linked to the gNB 104 via the dedicated communication medium 118A. The remote antenna array 106B is linked to the gNB 104 via the dedicated communication medium 118B, whereas the remote antenna array 106C is linked to the gNB 104 via the dedicated communication medium 118C. In accordance with another embodiment, each remote antenna array of the plurality of remote antenna arrays 106 may be communicatively coupled to the gNB 104 via a different point-to-point wireless communication medium that corresponds to the dedicated communication medium. An example of the point-to-point wireless communication medium is shown and described, for example, in FIG. 1B.

In accordance with an embodiment, the processor 102A may be further configured to segregate each SSB signal of the one or more SSB signals obtained at each remote antenna array. In the case where two or more SSBs (also referred to as SSB signals) are obtained by one remote antenna array, such two or more SSBs are segregated, for example, by multiplexing over a time domain, or a frequency domain, or a combination of the time domain and the frequency domain. The processor 102A may be further configured to cause the gNB 104 to distribute a different set of SSB signals to each remote antenna array of the plurality of remote antenna arrays 106 distributed spatially. The different set of SSB signals corresponds to the one or more SSB signals obtained by each remote antenna array of the plurality of remote antenna arrays 106. Even the SSBs not originally meant for a location of each remote antenna array with respect to the location of the gNB 104 in the conventional communication system, the processor 102A in the present disclosure beneficially may route such different SSBs to each of the plurality of remote antenna arrays 106, which would have otherwise not reach to at least some of the plurality of remote antenna arrays 106.

In accordance with an embodiment, the processor 102A may be further configured to cause the gNB 104 to associate a different beamforming weight to each SSB signal of the different set of SSB signals when the different set of SSB signals are distributed to each remote antenna array of the plurality of remote antenna arrays 106. The beamforming weight refers to a value used to compensate the transmission effects of the SSB signal at the remote antenna array. For example, a specific beamforming weight for a particular SSB signal for a particular remote antenna array may provide a gain to the SSB signal incident from a desired direction, while dynamically nulling signals from other spatial locations.

In accordance with an embodiment, the processor 102A may be further configured to cause the gNB 104 and the plurality of remote antenna arrays 106 to execute scheduling (i.e., follows scheduling in accordance with 5G NR) of the one or more SSB signals for each remote antenna array of the plurality of remote antenna arrays 106 such that there is no interference between two SSB signals.

Figure 1B:
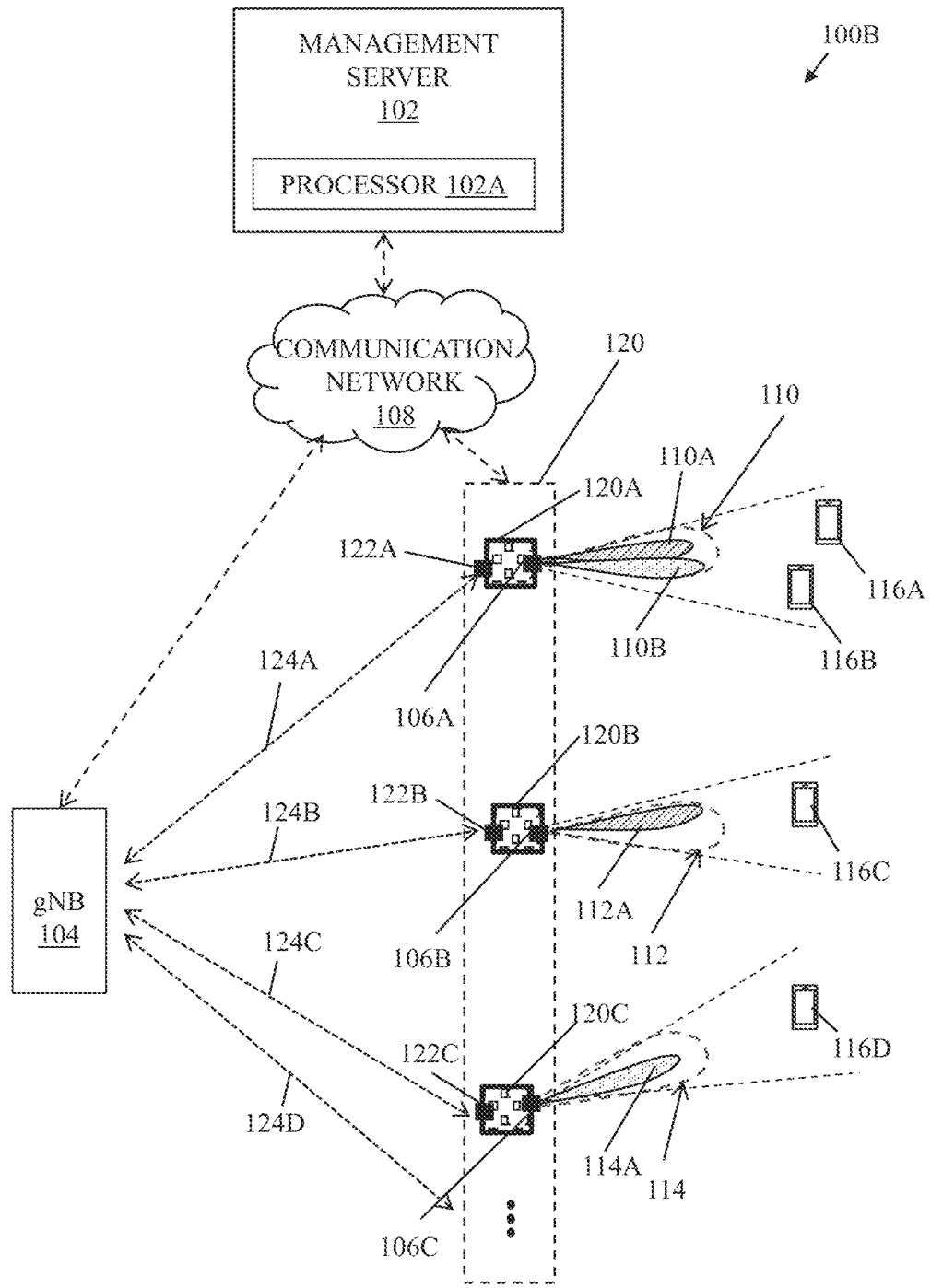
FIG. 1B is a diagram illustrating an exemplary communication system for remote antenna array-based high-speed low-latency 5G cellular connectivity, in accordance with another exemplary embodiment of the disclosure.

FIG. 1B is a diagram illustrating an exemplary communication system for remote antenna array-based high-speed low-latency 5G cellular connectivity, in accordance with another exemplary embodiment of the disclosure. FIG. 1B is described in conjunction with elements from the FIG. 1A. With reference to FIG. 1B, there is shown a block diagram of a communication system 100B that includes a plurality of network devices 120, such as network devices 120A, 120B, and 120C. Each of the plurality of network devices 120 may include a donor antenna array and a service antenna array (hereinafter referred to as a remote antenna array). For example, the network device 120A may include the donor antenna array 122A at the donor side and the remote antenna array 106A at the service side to service its corresponding one or more UEs, such as the UEs 116A and 116B. Similarly, the network device 120B may include the donor antenna array 122B at the donor side and the remote antenna array 106B at the service side to service its corresponding one or more UEs, such as the UE 116C. Lastly and similarly, the network device 120C may include the donor antenna array 122C at the donor side and the remote antenna array 106C at the service side to service its corresponding one or more UEs, such as the UE 116D.

Each network device (e.g., the network devices 120A, 120B, or 120C) may be communicatively coupled to the gNB 104 via a dedicated communication medium. The dedicated communication medium may be a wired communication medium (as shown, for example, in FIG. 1A), a point-to-point wireless communication medium (as shown here, for example, in FIG. 1B), or a combination thereof.

Each network device (e.g., the network devices 120A, 120B, or 120C) of the plurality of network devices 120 may be one of a XG-enabled repeater device, an XG-enabled Transmission/Reception Point (TRP), or an XG-enabled network node comprising an XG-enabled remote antenna array of an XG-enabled distributed antenna system (DAS), where the term "XG" refers to 5G or 6G radio communication. Each network device of the plurality of network devices 120 includes suitable logic, circuitry, and interfaces that may be configured to communicate with the gNB 104, the management server 102, and its corresponding one or more UEs, such as the UEs 116A,116B,116C, and 116D. Other examples of the implementation of the network device (e.g., the network devices 120A, 120B, or 120C) may include, but is not limited to an evolved-universal terrestrial radio access-new radio (NR) dual connectivity (EN-DC) device, a NR-enabled repeater device, or a wireless local area network (WLAN)-enabled device.

In operation, each network device of the plurality of network devices 120 may be distributed spatially in a specific geographical area, such as a specific locality or in and around a building. Each network device (e.g., a repeater device) of the plurality of network devices 120 may be configured to obtain a different synchronization signal block (SSB) signal in a mmWave frequency band from the gNB 104 over a dedicated communication medium. For example, the network device 120A may be configured to obtain a first SSB signal over a first point-to-point wireless communication medium 124A via its donor antenna array 122A. Similarly, the network device 120B may be configured to obtain a second SSB signal over a second point-to-point wireless communication medium 124B via its donor antenna array 122B. Similarly, the network device 120C may be configured to obtain a third SSB signal over a third point-to-point wireless communication medium 124C via its donor antenna array 122C. In an implementation, the mmWave frequency band may be in the range of 10 gigahertz (GHz) to 300 GHz. In another implementation, the mmWave frequency band may be in the range of 55 gigahertz (GHz) to 65 GHz. In yet another implementation, the mmWave frequency band may be 60 gigahertz (GHz). Moreover, each network device of the plurality of network devices 120 may be further configured to execute beamforming via its corresponding remote antenna array to direct one or more beams of RF signals (e.g., different SSB beams and its constituent refined beams) corresponding to the obtained one or more SSB signals to serve its corresponding UEs.

Figure 1C:
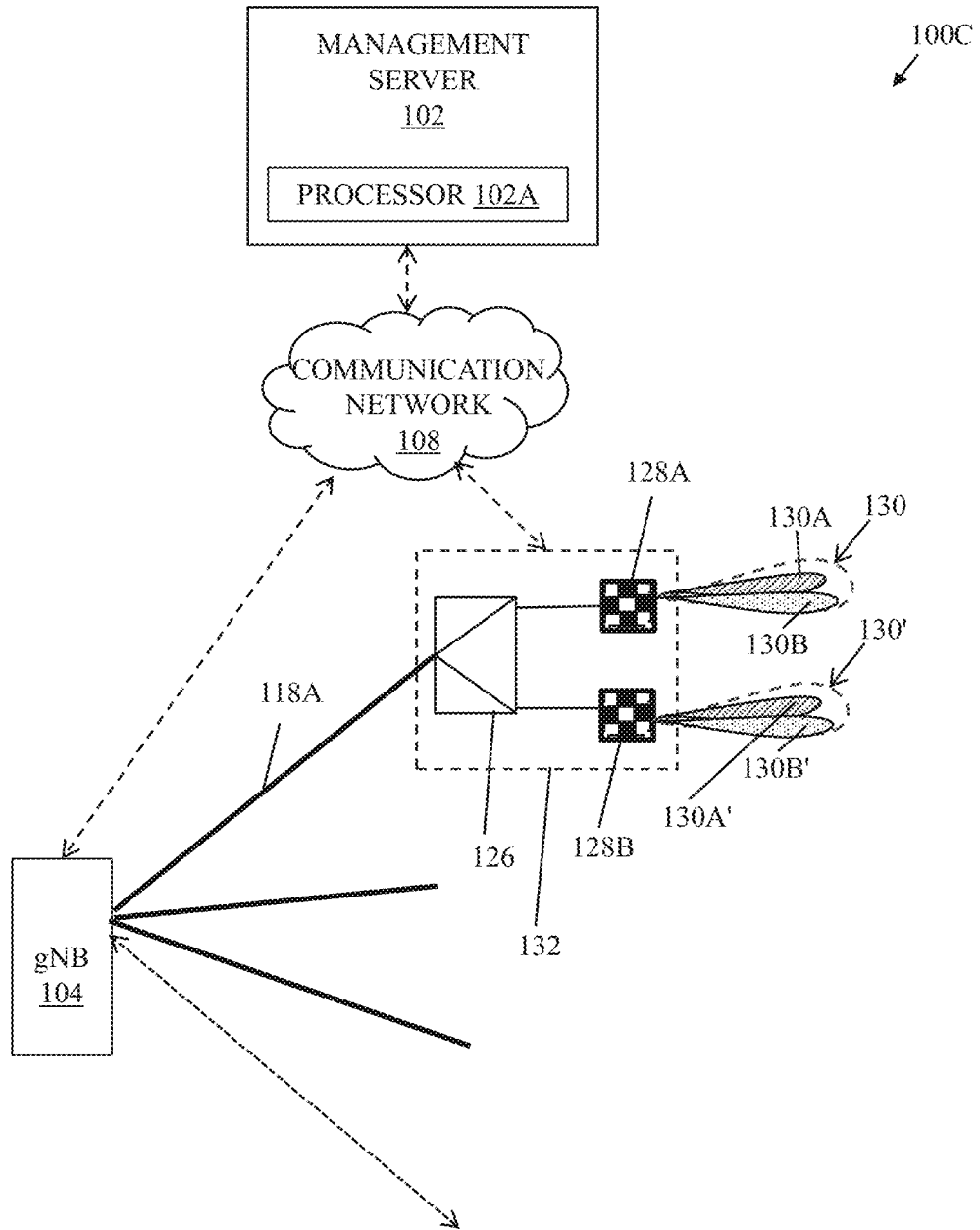
FIG. 1C is a diagram illustrating an exemplary communication system for remote antenna array-based high-speed low-latency 5G cellular connectivity, in accordance with yet another exemplary embodiment of the disclosure.

FIG. 1C is a diagram illustrating an exemplary communication system for remote antenna array-based high-speed low-latency 5G cellular connectivity, in accordance with yet another exemplary embodiment of the disclosure. FIG. 1C is described in conjunction with elements from the FIGS. 1A and 1B. With reference to FIG. 1C, there is shown a block diagram of a communication system 100C that includes a multi-way signal splitter and combiner 126 that may be provided in the communication path between the gNB 104 and remote antenna arrays to split the signal received from the gNB 104 over the dedicated communication medium 118A into two or more antenna arrays (e.g., two remote antenna arrays 128A and 128B) such that the two or more antenna arrays (e.g., two remote antenna arrays 128A and 128B) receive the same SSBs. Furthermore, in an implementation, a different set of UEs may be serviced by each of the two or more antenna arrays (e.g., two remote antenna arrays 128A and 128B), for example, by a frequency division multiplexing or a time-division multiplexing.

Alternatively, in an implementation, a network device 132 may comprise the two remote antenna arrays 128A and 128B and the multi-way signal splitter and combiner 126 configured to replicate the obtained one or more SSB signals from the gNB 104 such that each of two remote antenna arrays 128A and 128B obtains same SSB signals. Each of the two remote antenna arrays 128A and 128B may execute beamforming to direct SSB beams 130 and 130' and its constituent refined beams 130A and 130A', 130B, and 130B' (i.e., narrow beams) specific to its corresponding UEs for uplink and downlink mmWave communication. For instance, RF signals received from the UEs by the two remote antenna arrays 128A and 128B may be combined by the multi-way signal splitter and combiner 126 and further communicated upstream to the gNB 104.

Figure 1D:
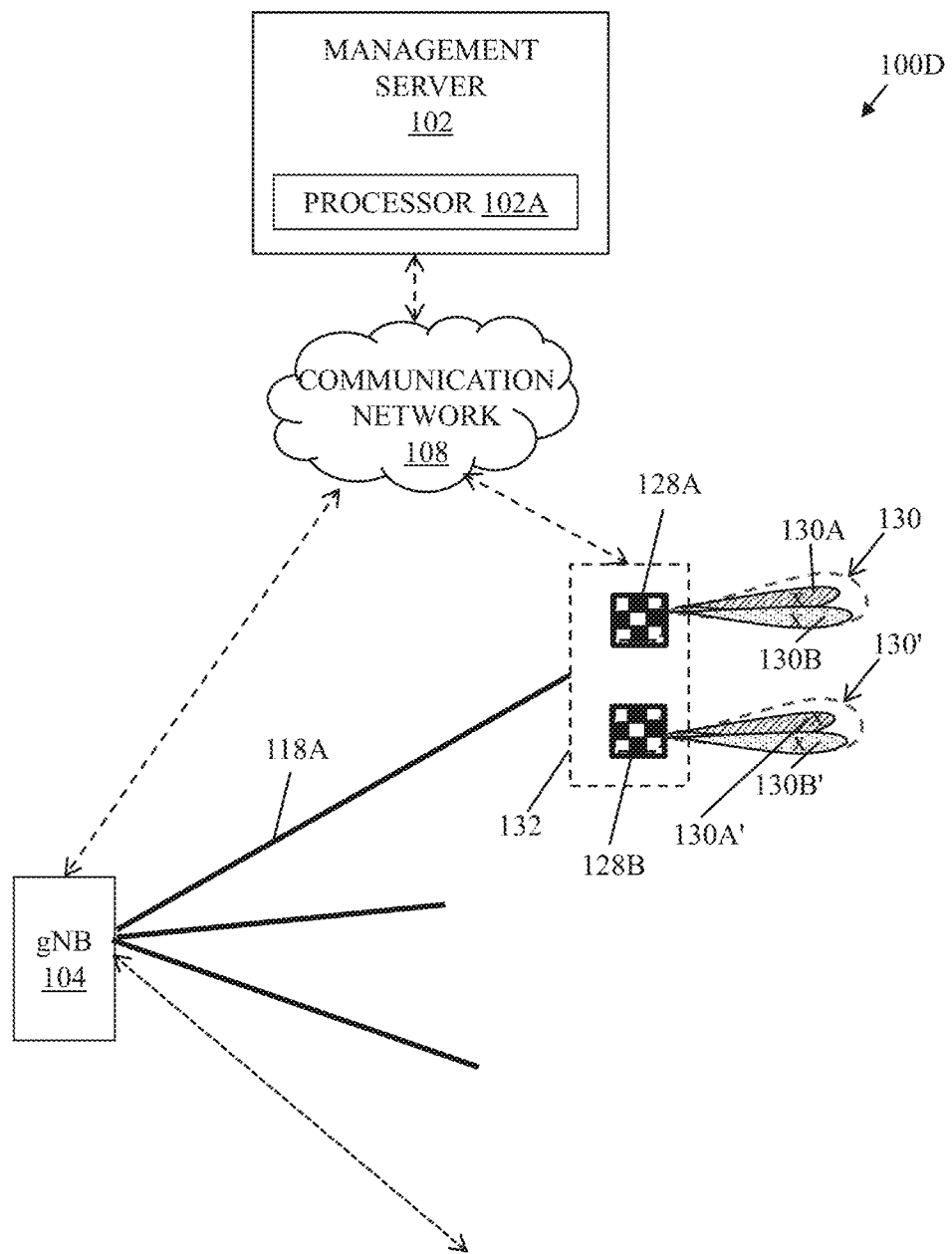
FIG. 1D is a diagram illustrating an exemplary communication system for remote antenna array-based high-speed low-latency 5G cellular connectivity, in accordance with still another exemplary embodiment of the disclosure.

FIG. 1D is a diagram illustrating an exemplary communication system for remote antenna array-based high-speed low-latency 5G cellular connectivity, in accordance with yet another exemplary embodiment of the disclosure. FIG. 1D is described in conjunction with elements from the FIGS. 1A, 1B, and 1C. With reference to FIG. 1D, there is shown a block diagram of a communication system 100D that includes the two remote antenna arrays 128A and 128B fed by a single communication medium, such as the dedicated communication medium 118A from the gNB 104. Each of the two remote antenna arrays 128A and 128B may include a number of antenna elements, and may be configured to transmit parallel data streams over multiple MIMO layers to one or more UEs. Each of the two remote antenna arrays 128A and 128B may employ spatial multiplexing to maintain isolation between the parallel data streams even if transferred over the same mmWave frequency at the same time.

In accordance with an embodiment, each of the two remote antenna arrays 128A and 128B may be further configured to support two cross-polarization layers (i.e., from single antenna array). Each of the two remote antenna arrays 128A and 128B may determine cross-polarization (vertical-horizontal) antenna settings to direct refined beams in cross-polarization settings.

Figure 2:
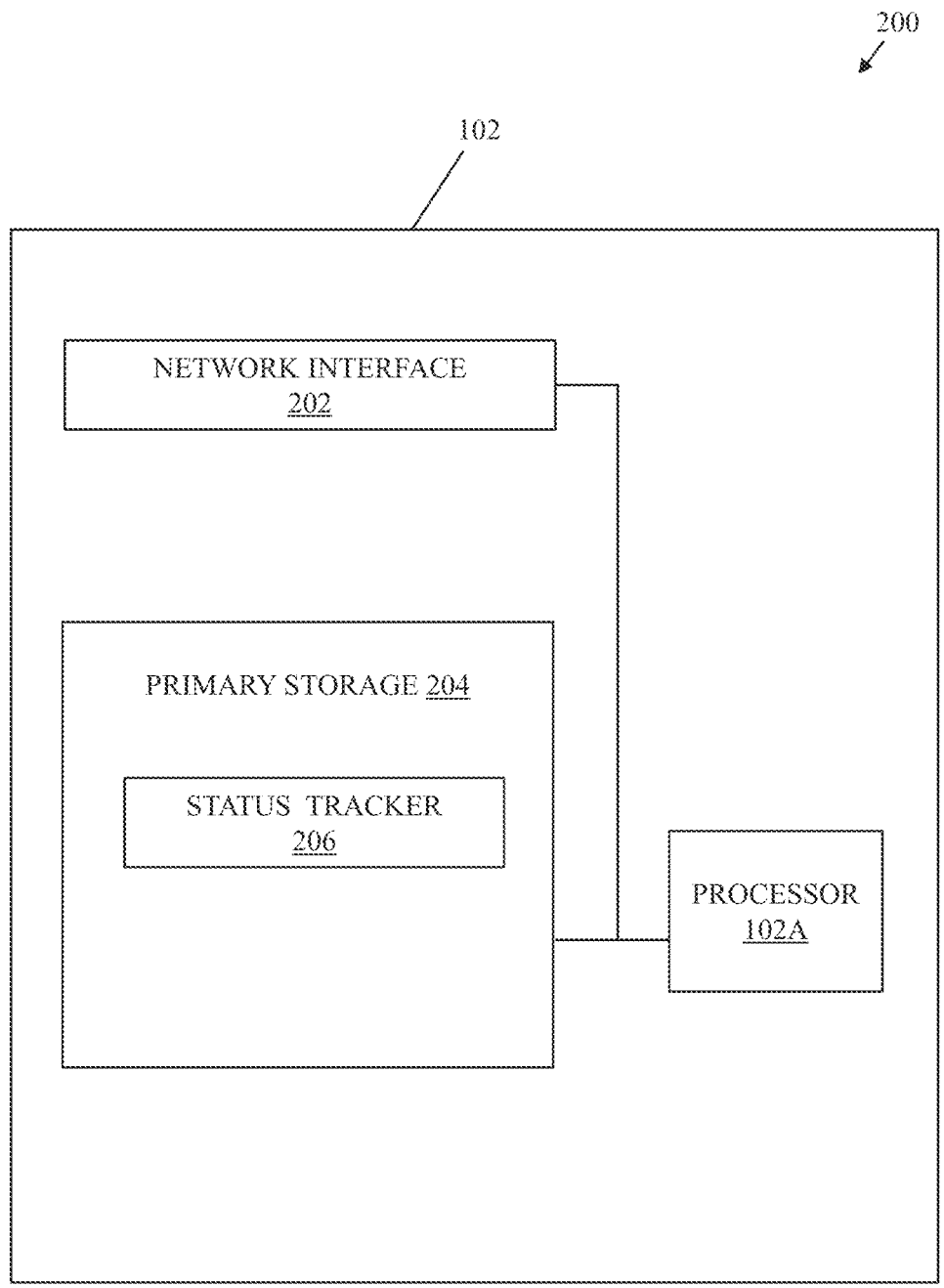
FIG. 2 is a block diagram that illustrates various components of an exemplary management server of a communication system, in accordance with an exemplary embodiment of the disclosure.

FIG. 2 is a block diagram illustrating various components of an exemplary management server of a communication system, in accordance with an exemplary embodiment of the disclosure. FIG. 2 is described in conjunction with elements from FIGS. 1A to 1D. With reference to FIG. 2, there is shown a block diagram 200 of the management server 102. The management server 102 may include the processor 102A, a network interface 202, and a primary storage 204. The primary storage 204 may further include a status tracker 206.

The processor 102A may be communicatively coupled to the network interface 202 and the primary storage 204. The processor 102A may be configured to execute various operations of the management server 102. The processor 102A may be configured to control various components of the management server 102.

The network interface 202 may comprise suitable logic, circuitry, interfaces, and/or code that may be configured to communicate with the plurality of remote antenna arrays 106 and the gNB 104. The network interface 202 may implement known technologies to support wired or wireless communication. The network interface 202 may include, but are not limited to a network interface card (NIC), an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 202 may communicate with networks, such as the Internet, an Intranet, and/or a wireless network, such as a cellular telephone network, a wireless local area network (WLAN), personal area network, and/or a metropolitan area network (MAN). The wireless communication may use any of a plurality of communication standards, protocols and technologies, such as Global System for Mobile Communications (GSM), wideband code division multiple access (W-CDMA), code division multiple access (CDMA), LTE 4G, 5G, time division multiple access (TDMA), Wireless Fidelity (Wi-Fi), Wi-MAX, light-fidelity (Li-Fi), Internet-of-Things (IoT), Machine-Type-Communication (MTC) technology, a protocol for email, instant messaging, Short Message Service (SMS), or quantum entanglement based communication.

The primary storage 204 may be configured to store the status tracker 206 that may be configured to track an active state of each of the plurality of remote antenna arrays 106. The processor 102A may utilize the status tracker 206 to track a network traffic load at the plurality of remote antenna arrays 106 distributed spatially over a geographical area. The primary storage 204 may be further configured store values calculated by the processor 102A. Examples of the implementation of the primary storage 204 may include, but not limited to, a cloud-based storage, a storage array, or other memory and storage systems. There may be one or more secondary storage servers, such as backup servers, which may implement backup policies for an automatic backup of data of the primary storage 204.

Figure 3:
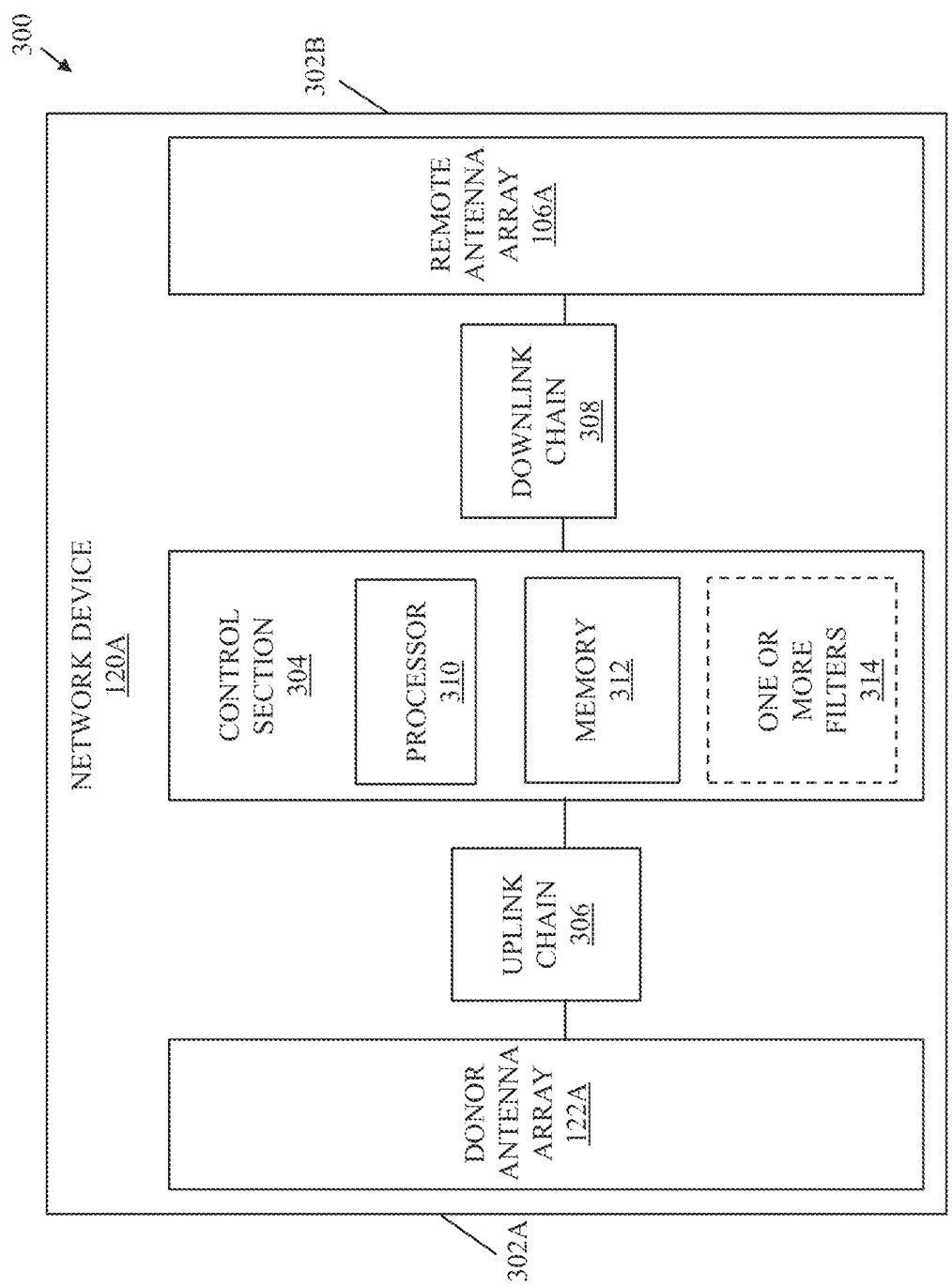
FIG. 3 is a block diagram that illustrates various components of an exemplary network device of a communication system, in accordance with an exemplary embodiment of the disclosure.

FIG. 3 is a block diagram illustrating different components of an exemplary network device, in accordance with an embodiment of the disclosure. FIG. 3 is explained in conjunction with elements from FIGS. 1A to 1D and 2. With reference to FIG. 3, there is shown a block diagram 300 of a network device, such as the network device 120A. The network device 120A may include a donor side 302A facing towards the gNB 104 (of FIG. 1B). The network device 120A also has a service side 302B facing towards one or more UEs, such as the UEs 116A and 116B (FIG. 1B). In an implementation, the network device 120A may include a control section 304 and a front-end radio frequency (RF) section, which may include a donor antenna array 122A and an uplink chain 306 at the donor side 302A, and further a service antenna array (such as the remote antenna array 106A) and a downlink chain 308 at the service side 302B. The control section 304 may be communicatively coupled to the front-end RF section, such as the donor antenna array 122A, the uplink chain 306, the remote antenna array 106A, and the downlink chain 308. The front-end RF section supports millimeter-wave (mmWave) communication as well communication at a sub 6 gigahertz (GHz) frequency. The control section 304 may further include processor 310, a memory 312, and one or more filters 314.

The network device 120A may be deployed at a fixed location. The network device 120A includes suitable logic, circuitry, and interfaces that may be configured to communicate with one or more base stations, such as the gNB 104, and one or more UEs, such as the UEs 116A and 116B. In accordance with an embodiment, the network device 120A may support multiple and a wide range of frequency spectrum, for example, 4G, 5G, and 6G (including out-of-band frequencies). The network device 120A may be one of an XG-enabled communication device, an XG-enabled repeater device, an XG-enabled relay device, an XG-enabled customer premise equipment (CPE), where the term "XG" refers to 5G or 6G communication.

The donor antenna array 122A may be provided at the donor side 302A, and may be communicatively coupled to the uplink chain 306. The remote antenna array 106A may be provided at the service side 302B and may be communicatively coupled to the downlink chain 308. Each of the uplink chain 306 and the downlink chain 308 may include a transceiver chain, for example, a cascading receiver chain and a cascading transmitter chain, each of which comprises various components for baseband signal processing or digital signal processing. For example, the cascading receiver chain various components, such as a set of low noise amplifiers (LNA), a set of receiver front end phase shifters, and a set of power combiners, for the signal reception (not shown here for brevity). Similarly, the cascading transmitter chain comprises various components for baseband signal processing or digital signal processing, such as a set of power dividers, a set of phase shifters, a set of power amplifiers (PA).

In an implementation, the remote antenna array 106A at the service side 302B supports multiple-input multiple-output (MIMO) operations and may be configured to execute MIMO communication with the one or more UEs within its communication range. The MIMO communication may be executed at mmWave frequencies or at a sub 6 gigahertz (GHz) frequency. Each of the donor antenna array 122A and the remote antenna array 106A may be one of an XG phased-array antenna panel, an XG-enabled antenna chipset, or an XG-enabled patch antenna array, where the "XG" refers to 5G or 6G. Examples of implementations of the XG phased-array antenna panel include, but are not limited to, a linear phased array antenna, a planar phased array antenna, a frequency scanning phased array antenna, a dynamic phased array antenna, and a passive phased array antenna.

In an implementation, a SSB signal received at a mmWave frequency may be upconverted or down converted, where the MIMO communication is executed at a different frequency with the UEs. This mode of operation may be beneficial and advantageous, given that the propagation at lower frequency results in rich scattering channel response, which leads to better MIMO capacity and MIMO performance.

The processor 310 may be communicatively coupled to the memory 312, the one or more filters 314, and the front-end RF section. The processor 310 may be configured to execute various operations of the network device 120A. The processor 310 may be configured to control various components of the front-end RF section, such as the donor antenna array 122A and the uplink chain 306 at the donor side 302A; and the remote antenna array 106A and the downlink chain 308 at the service side 302B. The network device 120A may be a programmable device, where the processor 310 may execute instructions stored in the memory 312. Example of the implementation of the processor 310 may include but are not limited to an embedded processor, a baseband processor, a Field Programmable Gate Array (FPGA), a microcontroller, a specialized digital signal processor (DSP), a control chip, a Reduced Instruction Set Computing (RISC) processor, an Application-Specific Integrated Circuit (ASIC) processor, a Complex Instruction Set Computing (CISC) processor, and/or other processors, or state machines.

The memory 312 may be configured to store beamforming weights associated with a SSB stream obtained from the gNB 104. The memory 312 may be further configured store values calculated by the processor 310. Examples of the implementation of the memory 312 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read-only memory (ROM), a hard disk drive (HDD), a secure digital (SD) card, a flash drive, cache memory, and/or other non-volatile memory. It is to be understood by a person having ordinary skill in the art that the control section 304 may further include one or more other components, such as an analog to digital converter (ADC), a digital to analog (DAC) converter, a cellular modem, and the like, known in the art, which are omitted for brevity.

In an implementation, the memory 312 may be configured store values of relative gain equalization that may be applied at the network device 120A before aggregating the RF signals from the end-user devices, such as the UEs 116A and 116B and sending them up upstream towards the gNB 104. In some embodiments, the relative gain values may be received from the management server 102. This enables the baseband processing units (MIMO pre-coding, decoding) to take in account such gain adjustment (which is not part of actual channel propagation between the remote antenna array 106A and an end-user device, such as the UEs 116A and 116B, in their MIMO processing.

The one or more filters 314 may be a band-pass filter, a multi-band filter or other channel select filter. The one or more filters 314 may be used to allow or reject one or more bandwidth parts (BWPs) of one or more NR frequency bands in an uplink and a downlink direction using the one or more filters 314.

In an implementation, the network device 120A at the donor side 302A may further include a wired connection system, such as one or more ports to connect to wired mediums, such as a coaxial cable, a fiber optic cable, and the like, to receive input over a wired medium from the gNB 104 and provide output to the remote antenna array 106A. In an implementation, the wired connection system may include suitable logic, circuitry, interfaces and/or code that is configured to convert electrical signal into the optical signal and transmit the optical signal via a wired medium, such as the dedicated communication medium 118A, to the gNB 104. Data may be communicated (sent and/or received) in form of the electrical signals which may be converted to optical signal (such as the mmWave RF signal). The wired connection system may be further configured to receive the optical signal via a wired medium (e.g., an optical link) and convert the optical signal into the electric signal. In some embodiments, the wired connection system may include a Receiver Optical Sub Assembly (ROSA) configured to communicate via the dedicated communication medium 118A. The ROSA may include one or more components, such as photodetector, electro-optical interface, and the like. Optionally, a Bi-Directional Optical Sub Assembly (BOSA) may be provided instead of ROSA. In some embodiments, the wired connection system may further include Transmitter Optical Sub Assembly (TOSA). The TOSA may be configured to convert electrical signal into optical signal, and then transmit the mmWave RF signal as optical signal to the gNB 104. TOSA may comprise one or more components such as photodetector, electro-optical interface, and the like. Optionally, the network device 120A may include a Bi-Directional Optical Sub Assembly (BOSA) instead of TOSA. Alternatively, in some embodiments, the wired connection system may communicate with a coaxial cable or other type of wired mediums instead of optical fiber.

In an exemplary implementation, the disclosed communication system 100A, 100B, 110c, or 110D may be used to create an improved Frequency Division Duplex (FDD) networks or Time Division Duplex (TDD) networks using a combination of wired and wireless mediums. In case of FDD networks, different/non-overlapping uplink and downlink channels may be utilized between the gNB 104 and each of the plurality of remote antenna arrays 106. In other words, full-duplex frequency channels may be transported within the wired connection between the gNB 104 and each of the plurality of remote antenna arrays 106 to support uplink/downlink channels. In case of TDD networks, (e.g., 5G-NR-TD), either TDD or FDD signaling may be deployed across the wired connection (e.g., the dedicated communication medium 118A, 118B, 118C, and 118D). Moreover, TDD channels may be maintained in time-domain using a single frequency channel inside the wired connection. In some embodiments, the disclosed communication system and method may be applied to the FDD network, where uplink and downlink data streams may be concurrently transported over two different frequency bands.

The network device 120A may be communicatively coupled to the gNB 104 via the dedicated communication medium (e.g., point-to-point wireless communication medium 124A of FIG. 1B). The network device 120 may include the processor 310 and the remote antenna array 106A. In operation, the processor 310 may be configured to obtain one or more SSB signals in a mmWave frequency band from the gNB 104 via the dedicated communication medium. In an implementation, the processor 310 may be configured to obtain one or more SSB signals via the donor antenna array 122A. In another implementation, in case of wired connection, like the dedicated communication medium 118A, the one or more SSB signals may be obtained via the wired connection system. In other words, the dedicated communication medium may be a wired communication medium, a point-to-point wireless communication medium, or a combination thereof. In one implementation, each remote antenna of the plurality of remote antenna arrays 106 may obtain one unique SSB. In another implementation, each remote antenna of the plurality of remote antenna arrays 106 may obtain two or more SSBs but the SSBs obtained at each remote antenna array may be different. The processor 310 may be further configured to execute beamforming to direct one or more beams of RF signals corresponding to the obtained one or more SSB signals via the remote antenna array 106A to serve its corresponding UEs, such as the UEs 116A and 116B. The one or more SSB signals obtained at the network device 120A may be different from other SSB signals obtained by a plurality of other network devices (e.g., the network devices 120B and 120C) distributed spatially in the communication system 100B (FIG. 1B).

In accordance with an embodiment, a SSB signal obtained by a remote antenna array may carry one or more data streams (i.e., a SSB, and data streams for refined beams) which are segregated. An example of the set of streams carried over a dedicated communication medium between the gNB 104 and a remote antenna array is shown and described, for example, in FIG. 4.

Moreover, in a case where the remote antenna array 106A obtains two SSB signals, such SSB signals may be obtained in segregated form. In other words, in such a case, the one or more SSB signals may be obtained in a segregated form over the dedicated communication medium (e.g., the dedicated communication medium 118A or 124A). In such a case, the segregation may be maintained by multiplexing the signals over a time domain, or a frequency domain, or a combination of the time domain and the frequency domain to serve each UE with a refined beam of RF signal with a signal-to-noise ratio (SNR) greater than a threshold. Furthermore, in an implementation, the network device 120A may include two remote antenna arrays (i.e., two service antenna arrays) and the multi-way signal splitter and combiner 126 configured to replicate the obtained one or more SSB signals such that each of two remote antenna arrays (e.g., the remote antenna arrays 128A and 128B of FIG. 1C) obtains same SSB signals. The processor 310 may be further configured to execute multi-user multiple input multiple output (MIMO) communication to serve its corresponding UEs (e.g., the UEs 116A and 116B).

Figure 4:
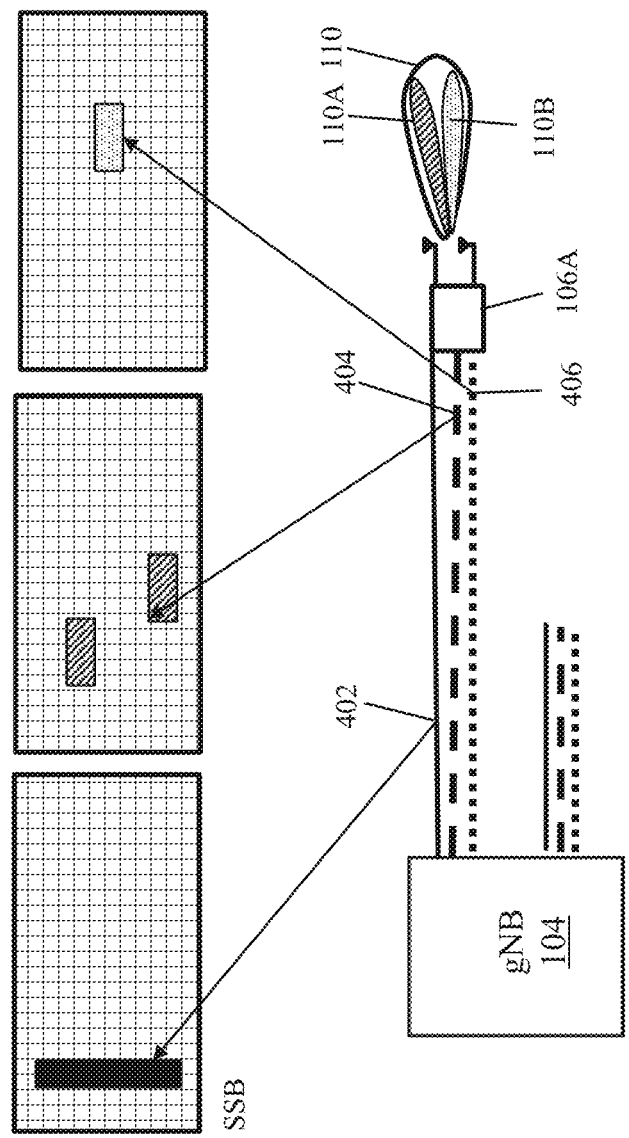
FIG. 4 is a diagram illustrating an exemplary scenario of signal transmission over a dedicated communication medium between a gNB and a remote antenna array in a communication system, in accordance with an embodiment of the disclosure.

FIG. 4 is a diagram illustrating an exemplary scenario of signal transmission over a dedicated communication medium between a gNB and a remote antenna array in a communication system, in accordance with an embodiment of the disclosure. FIG. 4 is explained in conjunction with elements from FIGS. 1A to 1D, 2, and 3. With reference to FIG. 4, there is shown the gNB 104, the remote antenna array 106A, the SSB beam 110 and its constituent refined beams 110A and 110B directed by the remote antenna array 106A. There is further shown a set of streams 402, 404, and 406 communicated from the gNB 104 over the dedicated communication medium 118A to the remote antenna array 106A. The set of streams 402, 404, and 406 may be received at the remote antenna array 106A as separate input streams (i.e., segregated signals), which may be then transmitted by the remote antenna array 106A as the SSB beam 110 and its constituent refined beams 110A and 110B (as shown for example). The receipt of set of streams 402, 404, and 406 over the dedicated communication medium 118A as separate streams may be done to avoid signal interference or any mixing of signals In an implementation, the set of streams 402, 404, and 406 corresponding to the SSB beam 110 and its constituent refined beams 110A and 110B may be multiplexed over time domain or frequency domain (i.e., signals over the dedicated communication medium 118A may be time or frequency multiplexed). In other words, the processor 102A may be further configured to cause the gNB to segregate the set of streams 402, 404, and 406 transmitted over the dedicated communication medium 118A (of FIG. 1A) from the gNB 104 to each remote antenna array, where the set of streams are related to one of the one or more SSB signals obtained at each remote antenna array. As a large amount of spectrum is available for a mmWave signal, the set of streams 402, 404, and 406 may be placed with suitable large gaps in between. This spaced alignment of each stream in the mmWave RF signal may be greater than a defined threshold and may be utilized for purpose of minimizing sensitivity and degradation due to other interfering signals operating in the same frequency bands. For example, in a conventional scenario, assuming, there are four RF waveforms from systems S1, S2, S3, S4, where each RF waveform may occupy 400 MHz spectrum. If all four streams (RF waveforms or signals) are packed and aligned next to each other in frequency domain, a bandwidth of about 1.6 GHz will be occupied.

In an implementation, the processor 102A of the management server 102 may be further configured to cause the gNB 104 to communicate the set of streams 402, 404, and 406 as separate streams (i.e., segregated signals) which may be then transmitted by the remote antenna array 106A as the SSB beam 110 and its constituent refined beams 110A and 110B. In other words, the processor 102A may be further configured to cause the remote antenna array 106A to obtain the set of streams 402, 404, and 406 corresponding to the SSB beam 110 and its constituent refined beams 110A and 110B as separate streams (or as multiplexed signals) over the dedicated communication medium 118A.

Figure 5:
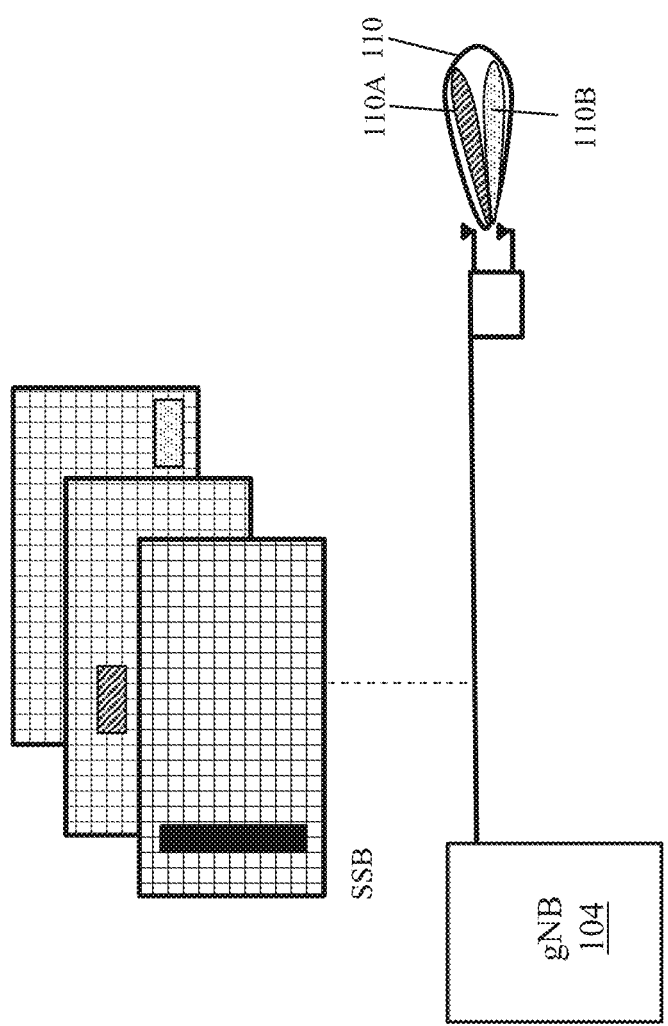
FIG. 5 is a diagram illustrating an exemplary scenario of scheduling in 5G NR for a gNB and a remote antenna array in a communication system, in accordance with an embodiment of the disclosure.

FIG. 5 is a diagram illustrating an exemplary scenario of scheduling in 5G NR for the gNB and the remote antenna array in a communication system, in accordance with an embodiment of the disclosure. FIG. 5 is explained in conjunction with elements from FIGS. 1A to 1D, 2, 3, and 4. With reference to FIG. 5, there is shown the gNB 104 and the remote antenna array 106A, which directs the SSB beam 110 and its constituent refined beams 110A and 110B to service one or more UEs. It is known that scheduling is the process of allocating resources for transmitting data. NR scheduling is controlled or dictated by a Network and the UEs generally follows the instructions from the network. Overall scheduling mechanism in 5G NR is similar to LTE scheduling, but NR has finer granularity than LTE especially in terms of time domain scheduling at physical layer.

The processor 102A may be further configured to cause the gNB 104 and the plurality of remote antenna arrays 106 (e.g., of FIG. 1) to execute scheduling of the one or more SSB signals for each remote antenna array of the plurality of remote antenna arrays 106 such that there is no interference between two SSB signals. The SSBs may be scheduled, where the scheduling may be restricted to allow for simpler front haul solution.

Figure 6:
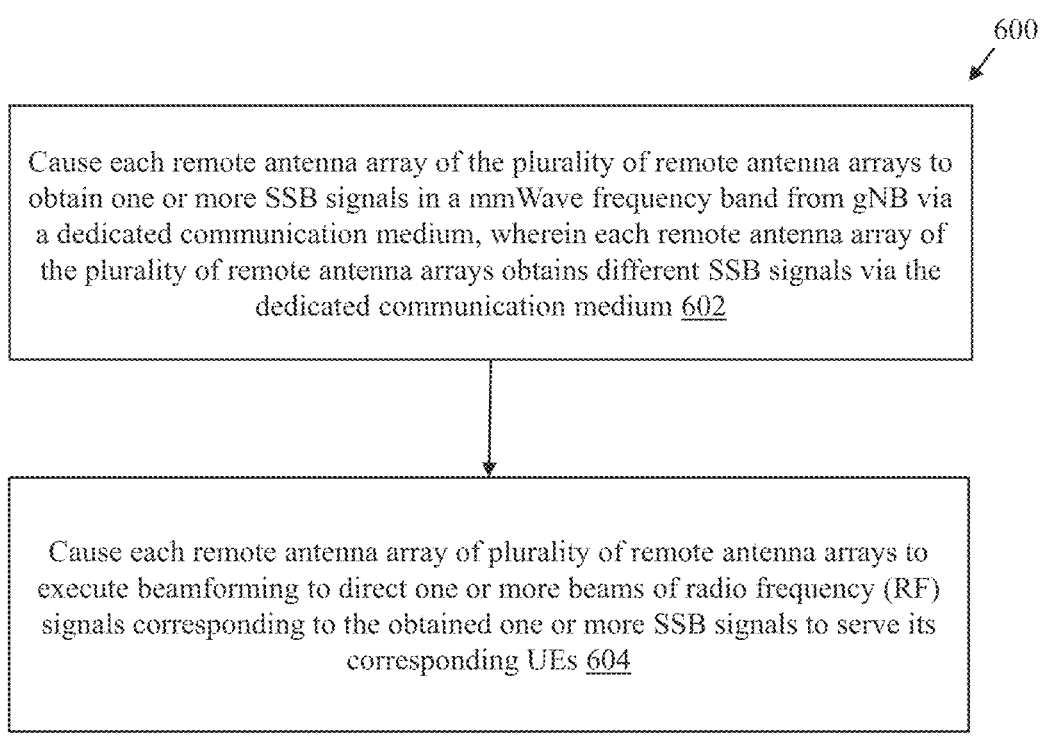
FIG. 6 is a flowchart that illustrates an exemplary communication method for remote antenna array-based high-speed low-latency 5G cellular connectivity, in accordance with an embodiment of the disclosure.

FIG. 6 is a flowchart that illustrates an exemplary communication method for remote antenna array-based high-speed low-latency 5G cellular connectivity, in accordance with an embodiment of the disclosure. FIG. 6 is explained in conjunction with elements from FIGS. 1A to 1D, 2, 3, 4, and 5. With reference to FIG. 6, there is shown a flowchart 600 comprising exemplary operations 602 to 604. The operations 602 and 604 may be implemented in the management server 102.

At 602, each remote antenna array of the plurality of remote antenna arrays 106 may be caused to obtain one or more synchronization signal block (SSB) signals in a mmWave frequency band from the gNB 104 via a dedicated communication medium (e.g., the dedicated communication medium 118A, 118B, or 118C). Each remote antenna array of the plurality of remote antenna arrays 106 may obtain different SSB signals via the dedicated communication medium (e.g., the dedicated communication medium 118A, 118B, or 118C). The processor 102A may be configured to cause each remote antenna array of the plurality of remote antenna arrays 106 to obtain one or more synchronization signal block (SSB) signals in the mmWave frequency band from the gNB 104 via a dedicated communication medium. The dedicated communication medium may be a wired communication medium or a point-to-point wireless communication medium.

At 604, each remote antenna array of the plurality of remote antenna arrays 106 may be caused to execute beamforming to direct one or more beams of radio frequency (RF) signals (e.g., a SSB beam 110 and its constituent refined beams 110A and 110B) corresponding to the obtained one or more SSB signals to serve its corresponding UEs (e.g., UEs 116A and 116B). The processor 102A may be further configured to cause each remote antenna array of the plurality of remote antenna arrays 106 to execute the beamforming to serve its corresponding UEs.

In accordance with an embodiment, the gNB may be caused to distribute a different set of SSB signals to each remote antenna array of the plurality of remote antenna arrays 106 distributed spatially. The different set of SSB signals corresponds to the one or more SSB signals obtained by each remote antenna array of the plurality of remote antenna arrays 106. In an implementation, the gNB 104 may be caused to associate a different beamforming weight to each SSB signal of the different set of SSB signals when the different set of SSB signals are distributed to each remote antenna array of the plurality of remote antenna arrays 106. In some implementations, the gNB 104 and the plurality of remote antenna arrays 106 may be caused to execute scheduling of the one or more SSB signals for each remote antenna array of the plurality of remote antenna arrays 106 such that there is no interference between two SSB signals. Furthermore, in some implementations, one or more operation settings at each remote antenna array of the plurality of remote antenna arrays 106 may be dynamically re-configured. Such dynamic re-configuration may be triggered/set by a plurality of factors: 1) capacity demand/requirements, 2) quality service or reliability requirements, 3) cross-interference measurements between coverage areas of each remote antenna array, 4) distributed MIMO capacity measurements for UEs throughout the coverage area, 5) based on a user defined updated controlled remotely by the management server 102.

Figure 7:
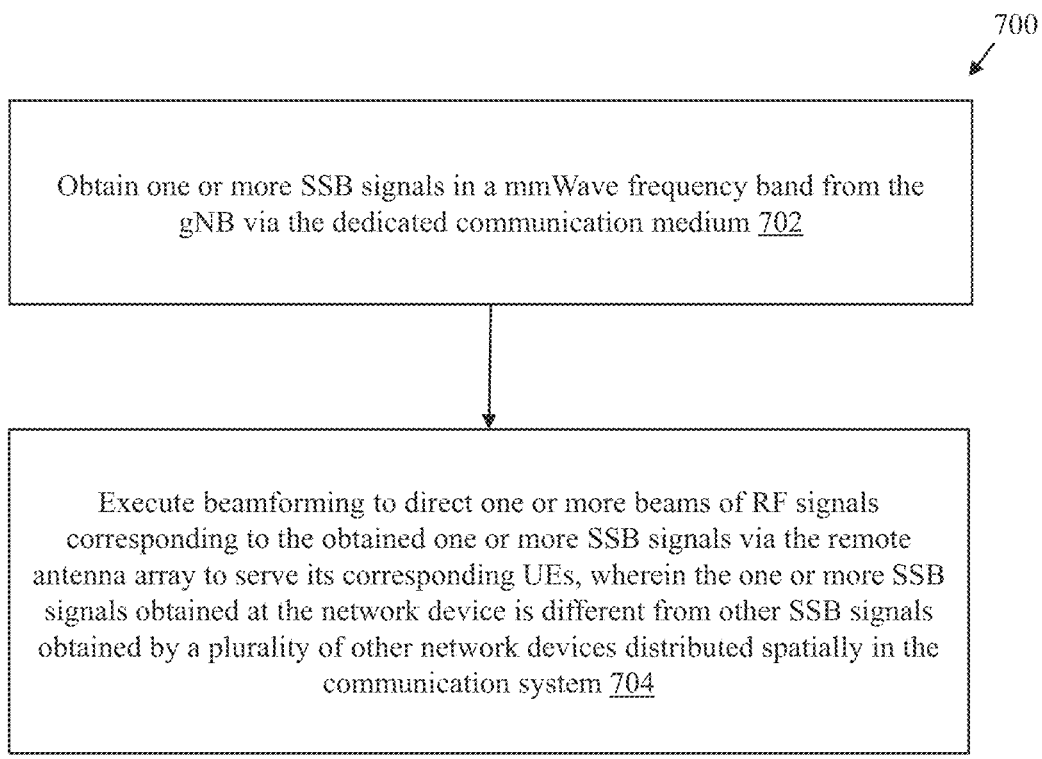
FIG. 7 is a flowchart that illustrates an exemplary communication method for remote antenna array-based high-speed low-latency 5G cellular connectivity, in accordance with another embodiment of the disclosure.

FIG. 7 is a flowchart that illustrates an exemplary communication method for remote antenna array-based high-speed low-latency 5G cellular connectivity, in accordance with another embodiment of the disclosure. FIG. 7 is explained in conjunction with elements from FIGS. 1A to 1D, 2, 3, 4, and 5. With reference to FIG. 7, there is shown a flowchart 700 comprising exemplary operations 702 to 704. The operations 702 and 704 may be implemented in the network device 120A.

At 702, one or more SSB signals may be obtained in a mmWave frequency band from the gNB 104 via a dedicated communication medium. For instance, the network device 120A may be configured to obtain a first SSB signal over a first point-to-point wireless communication medium 124A via the donor antenna array 122A of the network device 120A. Similarly, the network device 120B may be configured to obtain a second SSB signal over a second point-to-point wireless communication medium 124B via its donor antenna array 122B. Similarly, the network device 120C may be configured to obtain a third SSB signal over a third point-to-point wireless communication medium 124C via its donor antenna array 122C. Alternatively, the dedicated communication medium may be a wired communication medium.

At 704, beamforming may be executed to direct one or more beams of radio frequency (RF) signals (e.g., one or more SSB beams and its constituent refined beams) corresponding to the obtained one or more SSB signals via the remote antenna array 106A to serve its corresponding UEs. The one or more SSB signals obtained at the network device 120A may be different from other SSB signals obtained by a plurality of other network devices (e.g., the network devices 120B and 120C) distributed spatially in the communication system 100B.

In accordance with an embodiment, the one or more SSB signals may be obtained in a segregated form over the dedicated communication medium. The segregation may be over a time domain, or a frequency domain, or a combination of the time domain and the frequency domain to serve each UE with a refined beam of RF signal with a signal-to-noise ratio (SNR) greater than a threshold. In an implementation, MIMO communication may be executed by the remote antenna array 106A to serve its corresponding UEs (e.g., the UEs 116A and 116B).

The disclosed communication systems 100A, 100B, 100C, and 100D and the methods 600 and 700 are fully transparent to the UEs meaning that the UEs connect to their corresponding remote antenna array assuming the remote antenna array to be a standard gNB array. Thus, in other words, the remote antenna arrays takes the functionalities of the gNB (with some tweaks, for example, by handling less synchronization signal block (SSB) micro-sectors) closer to the UEs while improving coverage and data throughput.

Various embodiments of the disclosure may provide a non-transitory computer-readable medium having stored thereon computer implemented instructions that when executed by a computer to execute operations, the operations comprising causing each remote antenna array of the plurality of remote antenna arrays 106 to obtain one or more SSB signals in a mmWave frequency band from the gNB 104 via a dedicated communication medium, where each remote antenna array of the plurality of remote antenna arrays 106 obtains different SSB signals via the dedicated communication medium. The operations further comprises causing each remote antenna array of the plurality of remote antenna arrays 106 to execute beamforming to direct one or more beams of RF signals corresponding to the obtained one or more SSB signals to serve its corresponding UEs.

Various embodiments of the disclosure may provide a non-transitory computer-readable medium having stored thereon computer implemented instructions that when executed by a computer causes a communication apparatus (e.g., the network device 120A) to execute operations, the operations comprising obtaining one or more SSB signals in a mmWave frequency band from the gNB 104 via the dedicated communication medium and executing beamforming to direct one or more beams of RF signals corresponding to the obtained one or more SSB signals via the remote antenna array 106A to serve its corresponding UEs 116A and 116B, and where the one or more SSB signals obtained at the network device 120A is different from other SSB signals obtained by a plurality of other network devices distributed spatially in the communication system 100B.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g., computer readable code, program code, and/or instructions disposed in any form, such as source, object, or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A communication system, comprising:
a management server that is communicatively coupled to a gNodeB (gNB) and a plurality of remote antenna arrays distributed spatially over a geographical area, wherein the management server comprises a processor that is configured to:
cause each remote antenna array of the plurality of remote antenna arrays to obtain one or more signal synchronization block (SSB) signals in a mmWave frequency band from the gNB via a dedicated communication medium, wherein each remote antenna array of the plurality of remote antenna arrays obtains different SSB signals via the dedicated communication medium; and cause each remote antenna array of the plurality of remote antenna arrays to execute beamforming to direct one or more beams of radio frequency (RF) signals corresponding to the obtained one or more SSB signals to serve its corresponding user equipment (UEs).

2. The communication system according to claim 1, wherein each remote antenna array of the plurality of remote antenna arrays is communicatively coupled to the gNB via a different wired communication medium that corresponds to the dedicated communication medium, wherein the dedicated communication medium is a lossless link.

3. The communication system according to claim 1, wherein each remote antenna array of the plurality of remote antenna arrays is communicatively coupled to the gNB via a different point-to-point wireless communication medium that corresponds to the dedicated communication medium, wherein the dedicated communication medium is a lossless link.

4. The communication system according to claim 1, wherein the processor is further configured to cause the gNB to segregate a set of streams transmitted over the dedicated communication medium from the gNB to each remote antenna array, wherein the set of streams are related to one of the one or more SSB signals obtained at each remote antenna array.

5. The communication system according to claim 1, wherein the processor is further configured to cause the gNB to distribute a different set of SSB signals to each remote antenna array of the plurality of remote antenna arrays distributed spatially, wherein the different set of SSB signals corresponds to the one or more SSB signals obtained by each remote antenna array of the plurality of remote antenna arrays.

6. The communication system according to claim 5, wherein the processor is further configured to cause the gNB to associate a different beamforming weight to each SSB signal of the different set of SSB signals when the different set of SSB signals are distributed to each remote antenna array of the plurality of remote antenna arrays.

7. The communication system according to claim 1, wherein the processor is further configured to cause the gNB and the plurality of remote antenna arrays to execute scheduling of the one or more SSB signals for each remote antenna array of the plurality of remote antenna arrays such that there is no interference between two SSB signals.

8. The communication system according to claim 1, wherein each of the plurality of remote antenna arrays is a service antenna array provided in a network device, wherein the network device is at least one of: a repeater device, a Transmission/Reception Point (TRP), or a network node comprising a remote antenna array of an XG-enabled distributed antenna system (DAS), and wherein XG refers to 5G or 6G radio communication.

9. A communication system, comprising:
a network device that is communicatively coupled to a gNodeB (gNB) via a dedicated communication medium, wherein the network device comprises a processor and a remote antenna array, and wherein the processor is configured to:
obtain one or more signal synchronization block (SSB) signals in a mmWave frequency band from the gNB via the dedicated communication medium; and execute beamforming to direct one or more beams of radio frequency (RF) signals corresponding to the obtained one or more SSB signals via the remote antenna array to serve its corresponding user equipment (UEs), and wherein the one or more SSB signals obtained at the network device is different from other SSB signals obtained by a plurality of other network devices distributed spatially in the communication system.

10. The communication system according to claim 9, wherein the dedicated communication medium is a wired communication medium, a point-to-point wireless communication medium, or a combination thereof.

11. The communication system according to claim 9, wherein the one or more SSB signals are obtained in a segregated form over the dedicated communication medium, and wherein the segregation is over a time domain, or a frequency domain, or a combination of the time domain and the frequency domain to serve each UE with a refined beam of RF signal with a signal-to-noise ratio (SNR) greater than a threshold.

12. The communication system according to claim 9, wherein the network device further comprises two remote antenna arrays and a multi-way signal splitter and combiner configured to replicate the obtained one or more SSB signals such that each of two remote antenna arrays obtains same SSB signals.

13. The communication system according to claim 9, wherein the processor is further configured to execute multi-user multiple input multiple output (MIMO) communication to serve its corresponding UEs.

14. The communication system according to claim 9, wherein the network device is one of: a XG-enabled repeater device, an XG-enabled Transmission/Reception Point (TRP), or an XG-enabled network node comprising an XG-enabled remote antenna array of an XG-enabled distributed antenna system (DAS), and wherein XG refers to 5G or 6G radio communication.

15. A communication method, comprising:
causing, by a processor, each remote antenna array of a plurality of remote antenna arrays distributed spatially over a geographical area to obtain one or more signal synchronization block (SSB) signals in a mmWave frequency band from a gNodeB (gNB) via a dedicated communication medium, wherein each remote antenna array of the plurality of remote antenna arrays obtains different SSB signals via the dedicated communication medium; and causing, by the processor, each remote antenna array of the plurality of remote antenna arrays to execute beamforming to direct one or more beams of radio frequency (RF) signals corresponding to the obtained one or more SSB signals to serve its corresponding user equipment (UEs).

16. The communication method according to claim 15, further comprising causing, by the processor, the gNB to segregate a set of streams transmitted over the dedicated communication medium from the gNB to each remote antenna array, wherein the set of streams are related to one of the one or more SSB signals obtained at each remote antenna array.

17. The communication method according to claim 15, further comprising causing, by the processor, the gNB to distribute a different set of SSB signals to each remote antenna array of the plurality of remote antenna arrays distributed spatially, wherein the different set of SSB signals corresponds to the one or more SSB signals obtained by each remote antenna array of the plurality of remote antenna arrays.

18. The communication method according to claim 17, further comprising causing, by the processor, the gNB to associate a different beamforming weight to each SSB signal of the different set of SSB signals when the different set of SSB signals are distributed to each remote antenna array of the plurality of remote antenna arrays.

19. The communication method according to claim 15, further comprising causing, by the processor, the gNB and the plurality of remote antenna arrays to execute scheduling of the one or more SSB signals at each remote antenna array of the plurality of remote antenna arrays such that there is no interference between two SSB signals.

20. The communication method according to claim 15, further comprising causing, by the processor, each remote antenna array of the plurality of remote antenna arrays to execute multi-user multiple input multiple output (MIMO) communication to serve its corresponding UEs.

* * * * *